United States Patent [19]
Nash et al.

[11] 3,733,816
[45] May 22, 1973

[54] PUMP OPERATED COOLING SYSTEM USING COLD FUEL

[75] Inventors: John E. Nash, Avon; Charles W. Grennan, Newington, both of Conn.

[73] Assignee: Chandler Evans Inc., West Hartford, Conn.

[22] Filed: June 11, 1971

[21] Appl. No.: 152,264

[52] U.S. Cl.............60/39.28 R, 60/39.66, 415/179
[51] Int. Cl.............................F02c 9/04, F02c 7/12
[58] Field of Search.......................415/179, 27, 28, 415/71, 143, 175–178, 144; 165/47, 80; 60/39.66, 266, 267

[56] References Cited

UNITED STATES PATENTS

| | | | |
|---|---|---|---|
| 3,507,577 | 4/1970 | Swearingen | 415/177 |
| 2,625,007 | 1/1953 | Truax | 60/39.66 |
| 3,080,716 | 3/1963 | Cummings et al. | 60/39.66 |
| 2,984,189 | 5/1961 | Jekat | 415/143 |
| 3,520,133 | 7/1970 | Loft et al. | 60/39.28 R |
| 3,011,313 | 12/1961 | Horton | 60/39.66 |
| 2,970,437 | 2/1961 | Anderson | 60/39.66 |

FOREIGN PATENTS OR APPLICATIONS

| | | | |
|---|---|---|---|
| 567,846 | 12/1932 | Germany | 415/179 |

Primary Examiner—Carlton R. Croyle
Assistant Examiner—Robert E. Garrett
Attorney—Radford W. Luther

[57] ABSTRACT

A cooling system for an electronics unit of a fuel control which includes a pump with an axial inducer first stage and a centrifugal impeller second stage, the stages being thermally insulated from each other. Relatively cold fuel from a fuel tank enters the axial stage and is delivered from there to a heat exchanger arrangement in the electronics unit. Fuel flow from the heat exchanger is returned to the pump at the inlet of the centrifugal stage which pumps the fuel to the fuel control. A bypass valve, designed to crack at a predetermined pressure, furnishes an additional flow path from the outlet of the axial stage to the inlet of the centrifugal stage.

7 Claims, 1 Drawing Figure

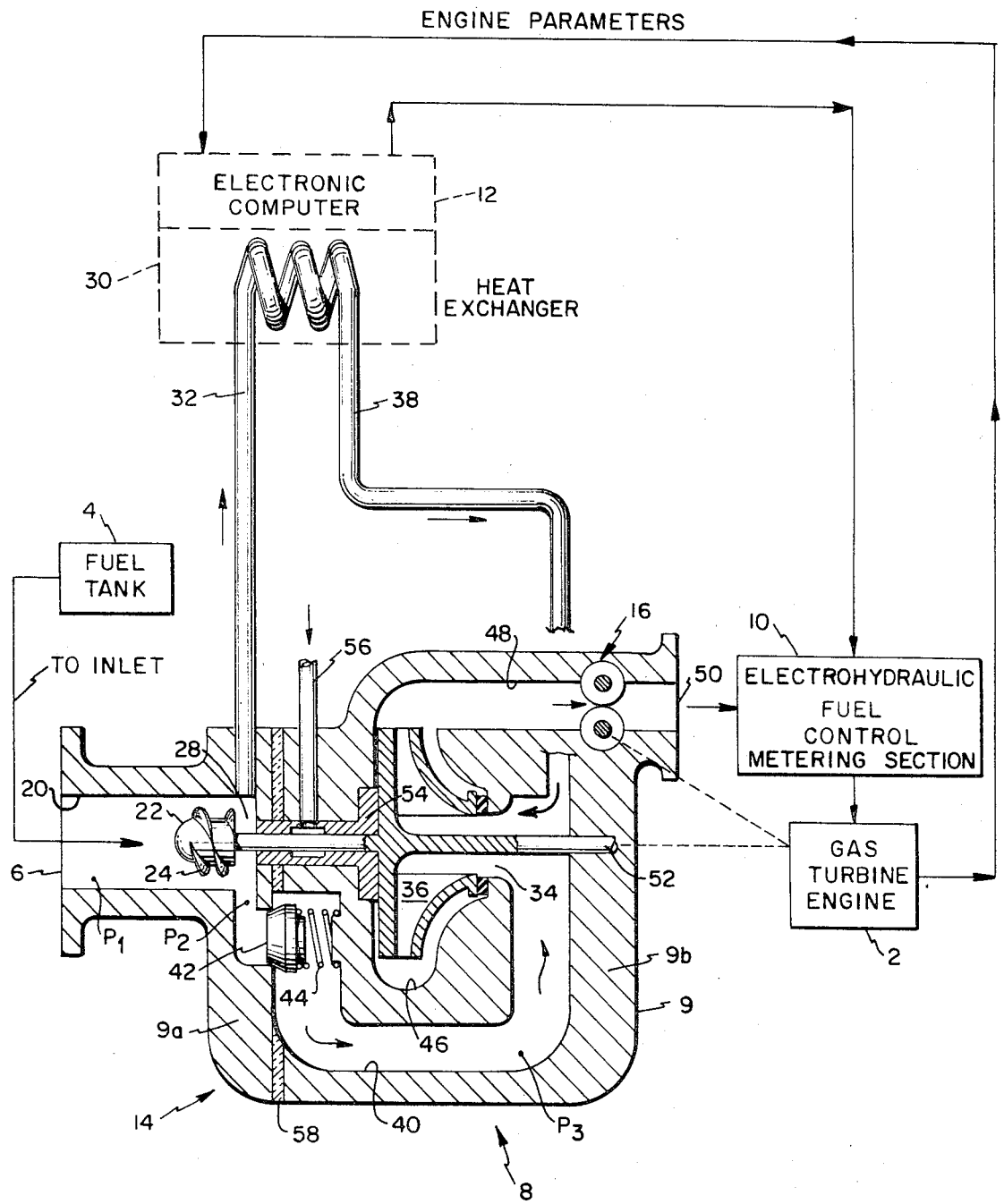

PUMP OPERATED COOLING SYSTEM USING COLD FUEL

BACKGROUND OF THE INVENTION

This invention relates to cooling systems, and more particularly to cooling systems for electronic units mounted on fuel controls.

It is well known that electronic units generate considerable heat, and frequently require some sort of cooling in order to function properly. In the past, such units have been cooled with engine fuel by arrangement which utilized a low temperature fuel and/or a refrigeration cycle. In gas turbine engine applications, refrigerated fuel may not be practicable since at least a compressor must be additionally provided.

SUMMARY OF THE INVENTION

The invention provides a cooling system for the electronics unit of an electromechanical fuel control. The cooling system forms an integral part of the fuel control itself, thereby obviating the inclusion of a separate system to cool the electronics unit. A system according to the invention does not require any expansion or compression apparatus, and thus places only a minimum burden upon the power output of the engine. In addition, a cooling system according to the invention will not occasion a significant weight increase in the fuel control unit or render it unduly complex.

In brief, the invention employs a pump having two impeller stages adapted to transfer fuel from a tank to a positive displacement pump which supplies pressurized fuel to the metering section of a fuel control. The first stage preferably embodies an axial inducer to provide the high suction necessary to maintain operation at typical vapor to liquid ratios (V/L) and furnish a limited pressure rise to propel the fuel through the electronics unit. Fuel from the first stage enters a heat exchanger in the electronics unit and passes thence to the inlet of a centrifugal stage. Fuel from the centrifugal stage is directed to the metering section via the positive displacement pump which functions as a further pressure generating source.

The invention is advantageous since the low pressure rise of the first stage yields an extremely small heat input to the fuel from the tank due to pump inefficiency. For example, a system of the invention can permit operation of an electronics cold plate at temperatures as low as 165° F, with 135° F fuel inlet temperature at the first stage.

Accordingly, it is a primary object of the invention to provide a pump-operated cooling system.

Another object is to provide a cooling system for an electronics unit of a fuel control for a gas turbine engine.

Still another object is to provide a cooling system incorporating a two-stage impeller type pump wherein the output flow of the first stage is directed to a heat exchanger, and thence to the inlet of the second stage.

These and other objects, not specifically recited hereinabove, will become more readily apparent from the following description taken in conjunction with the drawing.

BRIEF DESCRIPTION OF THE DRAWING

The drawing is a schematic view of an embodiment of a cooling system according to the invention.

DETAILED DESCRIPTION OF THE PREFERRED EMBODIMENT

Referring to the drawing, a fuel control is shown in association with a gas turbine engine 2. Fuel from a tank 4 is ducted by appropriate means to the inlet 6 of the fuel control for metering and eventual delivery to the burners of the gas turbine engine 2. The illustrated fuel control basically comprises a pumping section, generally shown at 8, a metering section 10 which is supplied with pressurized fuel by the pumping section 8, and an electronic computer 12 which senses engine parameters such as various speeds, temperatures and pressures, and accordingly controls certain of the elements which constitute the metering section such that a properly metered flow is delivered to the engine. It will be understood that the metering section may also include actuators for control of the variable geometry portions of the engine.

The pumping section 8 includes a two-stage impeller pump 14 and a positive displacement pump 16, such as a gear pump or vane pump. The impeller pump 14 and the gear pump 16 are preferably, although not necessarily, drivingly interconnected to the engine so as to be operable thereby, and if space limitations warrant, may be interconnected by a single shaft, thereby minimizing shaft lengths. It will be appreciated the interconnection may be of the mechanical (e.g., a gear box), electrical (e.g., an electric motor) or fluid (e.g., hydraulic turbine) variety. In order to bypass excess fuel delivered from the positive displacement pump to the metering section 10, a bypass line (not shown) may be included to interconnect the metering section and the inlet side of the gear pump in any suitable manner.

The impeller pump 14 comprises an inlet conduit 20 which receives inlet flow from the tank 4 via inlet 6. Mounted within the inlet conduit is an axial inducer 22 formed by a hub portion 24 having a rounded end and the usual helical blade 26 carried by the portion 24. The outlet 28 of the axial inducer communicates with a heat exchanger 30 mounted within the electronic unit 12 in such a manner as to cool the cold plate thereof, the cooling flow being delivered to the heat exchanger via an inlet duct 32 which fluidly communicates with the outlet 28 of the axial inducer 22. The flow emerging from the heat exchanger 30, which has absorbed heat from the electronics unit, is delivered to the inlet 34 of a centrifugal impeller pump 36 via an outlet duct 38.

An additional flow path to the inlet 34 of the pump 36 is defined by a bypass duct 40 incorporating a bypass valve 42 biased to the closed position by a spring 44. For high engine flow requirements, bypass valve 42 will open upon being subjected to a predetermined pressure differential ($P_2 - P_3$), to thereby permit flow from the outlet 28 of the axial inducer to proceed to the inlet 34 of centrifugal impeller 36 through the additional path defined by bypass duct 40. The discharge flow in the volute 46 of the centrifugal impeller 36 is directed to outlet conduit 48 from where the flow proceeds to the inlet of the positive displacement pump 16.

As shown in the drawing, the axial inducer 22 and the centrifugal impeller 36 are mounted upon a common drive shaft 52 which extends through the housing 9 and is journaled in a bearing 54. To provide for the lubrication of the shaft 52, a lubrication line 56 communicates with an annulus recessed upon the bearings cylindrical inner surface. Clean fluid, which may be filtered fuel, under pressure, is furnished to the line 56 to insure that contaminants in the fuel will not deteriorate the engagement between the shaft 52 and the bearing 54.

Obviously, the effectiveness of the heat transfer operation in the electronics unit 12 is predicated on delivering relatively cold fuel to inlet duct 32. To this end, the pressure rise across the axial inducer must be kept small (e.g., 5-10 psi) so that the fuel temperature is not significantly increased. Furthermore, heat transfer from housing portion 9b, which contains heated fuel, to housing portion 9a, which contains cold fuel, must be minimized. Thus, a packing of insulating material 58, such as asbestos, is interposed between the housing portions to maintain the rate of heat transfer at an acceptable level, whereby the heat transfer operation will not be adversely affected.

In operation, the first stage impeller (axial inducer 22) provides the high suction specific speed to maintain operation under high V/L conditions (e.g., 0.45) and the necessary limited pressure rise for propelling fuel to the heat exchanger. The low pressure rise across the axial inducer 22 is critical because it inhibits heat rejection to the fuel from pump inefficiency. Flow from the first stage proceeds to the heat exchanger 30 via outlet 28 and inlet duct 32. Heat from the electronics unit is transferred to the flow leaving heat exchanger via the unit's cold plate, the heated flow being directed to the inlet 34 of the second stage (centrifugal impeller 36). As the speed and flow increases in accordance with demands by the engine, the pressure differential $(P_2 - P_3)$ will accordingly increase. When this differential attains a predetermined value, bypass valve 42 will open, thereby permitting flow to the inlet 34 of centrifugal inducer 36 to also proceed through bypass line 40. Hence, the parallel flow paths to the inlet 34 assure a sufficient pressure rise for charging the inlet of pump 16. The impeller may operate at relatively high fuel temperatures, such as 250° F, but heat transfer to the fuel discharged by the axial inducer is prevented by the insulation 58. Pressurized flow from pump 16 emerges from outlet 50 which directs fuel to metering section 10. Flow metered by the metering section 10 is directed to the burners of the engine and excess flow delivered to the metering section is returned to the inlet of the pump 16 by the aforementioned bypass line (not shown).

If centrifugal impeller 36 is sized so as to be capable of supplying fuel to the engine after starting requirements have been met, the pump 16 may include unloading means, such as shown, for example, in U.S. Pat. application Ser. No. 73,378, filed Sept. 17, 1970, in the names of Charles W. Grennan and Evert von Moltke and entitled "Lifting Tip Seal Pump."

The illustrated arrangements permit cooling of an electronics unit with a pump having a high V/L suction performance. It has been determined that best results are obtainable from the illustrated system when the first stage impeller is designed to provide a low pressure rise (i.e., under 10 psi), and that an axial inducer is the most desirable type of pump for this application since it inherently yields superior suction performance. Moreover, the first stage impeller must be carefully insulated from the second stage impeller to frustrate heat conduction between the first and second stages.

Obviously, many modifications of the illustrated system are possible in light of the above teachings. For example, in order to obviate the insulation 58, the first and second stages of pump 8 could be placed in separate housings, suitably spaced from each other. It will also be understood that the heat exchanger 30 may be associated with a device other than an electronics unit for which cooling is desired or, for that matter, a plurality of devices.

Hence, the above disclosure is to be considered as being illustrative of the invention, and not as being limited thereof, since other modifications of the described embodiment are possible without departing from the spirit and scope of the invention as hereinafter defined by the appended claims.

What we claim is:

1. In combination:
   a gas turbine engine;
   an electronic computer operatively connected to the engine to sense various engine parameters;
   a fuel tank adapted to contain fuel for the engine;
   a first impeller pump having an inlet and an outlet for respectively receiving fuel from the tank and discharging fuel;
   a second impeller pump having an inlet and an outlet;
   a heat exchanger connected to the computer to withdraw heat therefrom, the heat exchanger being fluidly connected to the outlet of the first impeller pump to receive a cooling flow therefrom and the inlet of the second impeller pump to discharge the flow heated by the computer thereto;
   a bypass duct in parallel with the heat exchanger fluidly interconnecting the outlet of the first impeller pump and the inlet of the second impeller pump to provide an additional flow path from the outlet of the first impeller pump to the inlet of the second impeller pump;
   valve means responsive to a predetermined pressure differential between the outlet of the first impeller pump and the inlet of the second impeller pump to control flow in the bypass duct such that a sufficient pressure rise for charging the inlet of the second impeller pump is assured;
   a positive displacement pump having an inlet fluidly connected to the outlet of the second impeller pump and an outlet for directing a pressurized flow to the engine;
   means drivingly interconnecting the first impeller pump and the second impeller pump; and
   means drivingly connecting the first impeller pump, the second impeller pump and the positive displacement pump to the engine.

2. The combination, as defined in claim 1, wherein the first impeller pump consists essentially of an inducer having a helical blade, and wherein the second impeller pump comprises a centrifugal impeller.

3. The combination, as defined in claim 2, further including:
   a metering device operatively connected to the computer so as to be controlled in accordance with the parameters sensed thereby and to the outlet of the positive displacement pump for delivering a metered flow of fuel to the engine.

4. The combination, as defined in claim 2, further including:
   an insulating material interposed between the first impeller pump and the second impeller pump to prevent heat transfer therebetween.

5. In combination:
   an engine;

a heat generating device for controlling the engine;
a source of fuel for the engine;
a first housing portion having an inlet for receiving fuel from the source and an outlet for discharging the fuel;
an inducer, having a helical blade, mounted in the first housing portion between the inlet and the outlet thereof such that the blade is adapted to provide a pressure rise at the outlet;
a heat exchanger connected to the device to withdraw heat therefrom, the heat exchanger being fluidly connected to the outlet of the first housing portion to receive a flow of cooling fuel;
a second housing portion having an inlet fluidly connected to the heat changer to receive the fuel heated therein and an outlet for discharging the heated fuel;
an impeller mounted in the second housing portion between the inlet and the outlet thereof for supplying fuel to the engine;
a shaft drivingly interconnecting the inducer and the impeller;
means to drivingly connect the inducer and the impeller to the engine;
an insulating material interposed between the first housing portion and the second housing portion to prevent heat transfer therebetween;
a bypass duct in parallel with the heat exchanger fluidly interconnecting the outlet of the first housing portion and the inlet of the second housing portion to provide an additional flow path from the outlet of the first housing portion to the inlet of the second housing portion; and
valve means responsive to a predetermined pressure differential between the outlet of the first housing portion and the inlet of the second housing portion to control flow in the bypass duct such that a sufficient pressure rise for charging the inlet of the second housing portion is assured.

6. The combination, as defined in claim 5, further including:
a positive displacement pump having an inlet and an outlet, the inlet of the positive displacement pump being fluidly connected to the outlet of the second housing portion to receive the output flow thereof;
means drivingly connecting the positive displacement pump to the engine; and
a metering device fluidly connected to the outlet of the positive displacement pump to receive a flow of fuel therefrom and fluidly connected to the engine to deliver a metered flow of fuel thereto, the metering device being operatively connected to the heat generating device so as to be controlled thereby.

7. The combination, as defined in claim 6, wherein the impeller is a centrifugal impeller, and the inducer is an axial inducer; and wherein the heat generating device is an electronic computer adapted to sense various engine parameters.

* * * * *